United States Patent [19]

Cunningham, Jr.

[11] Patent Number: 4,983,081

[45] Date of Patent: Jan. 8, 1991

[54] APPARATUS AND METHOD FOR FORMING SHIPLAP DUCT

[75] Inventor: Robert A. Cunningham, Jr., Argyle, Tex.

[73] Assignee: Glass Master Corporation, San Antonio, Tex.

[21] Appl. No.: 360,196

[22] Filed: Jun. 1, 1989

[51] Int. Cl.$^5$ .............................. B23D 3/06
[52] U.S. Cl. ........................ 83/39; 409/293; 144/136 R; 83/875; 83/522.22
[58] Field of Search ............... 83/875–878, 83/745, 614.39, 522.22, 522.17, 136 R; 409/132, 304, 293; 144/136 R, 136 C; 493/363, 356, 340

[56] References Cited

U.S. PATENT DOCUMENTS

| | | | |
|---|---|---|---|
| 3,605,534 | 9/1971 | Barr | 83/698 X |
| 3,875,835 | 4/1975 | Roberts | 144/136 R X |
| 3,935,767 | 2/1976 | McClay, Jr. | 144/136 R |
| 4,379,419 | 4/1983 | Woock et al. | 83/875 |
| 4,411,183 | 10/1983 | Aver | 83/875 X |
| 4,608,902 | 9/1986 | Ivey | 83/745 X |

Primary Examiner—Z. R. Bilinsky
Assistant Examiner—Robert Schultz
Attorney, Agent, or Firm—M. H. Gay

[57] ABSTRACT

Apparatus and method of forming shiplap grooves (21, 23, 25, 26 and 28) in a duct board (12) utilizing a square (35) and measuring indicia (39). The apparatus comprises shiplap groove cutting tools (22) and (24) and an angle square (35) comprising a guide leg (37) and a base leg (36) having indicia (39) indicative of the desired dimensions for a resulting shiplap duct. The shiplap groove cutting tools have sleds (57, 67, 58 and 56) which are placed against the guide leg (37) to be guided by the same to produce shiplap grooves (23, 25 and 26). The length of the spacing between the grooves is equal to the indicated indicia (39) for the narrow sleds (57 and 68) or the indicated indicia plus the thickness of the board for the wide sleds.

11 Claims, 7 Drawing Sheets

APPARATUS AND METHOD FOR FORMING SHIPLAP DUCT

This invention relates to forming ducts and more particularly to forming ducts from duct board with shiplap grooves utilizing an angle square and grooving tools.

Shiplap and V-groove ducts have been formed from duct board. Machines for this purpose are well known. See U.S. Pat. No. 3,605,534. Angle squares and hand operated V-groove tool are available for measuring and cutting V-groove ducts. See U.S. Pat. No. 4,608,902. Measuring and cutting V-grooves involves the use of a single V-groove cutting tool and readily measured dimensions. In cutting grooves for a duct having equal sides such as a 10 by 10 duct the operator measures equal distances from the last cut V-groove as the distance between the edges of adjacent V-grooves is the same on each side of the duct. See U.S. Pat. 4,608,902. This system is not appropriate for shiplap grooves as the distance between the edges of adjacent shiplap grooves is not the same for each wall of a square duct.

Shiplap duct should have a female shiplap on opposite sides of the duct when a section is cut out to receive a male shiplap end of duct to connect a 90 degree side run to a duct. Thus the shiplap cuts are not made at random but should be made in a predesigned relationship.

An object of this invention is to provide a square and hand tool apparatus and method for hand cutting shiplap groove duct board in which measurements are made from a base leg indicia indicating the size of each duct wall, to cut alternate right and left hand shiplap grooves and a flap for a rectangular duct.

Another object is to provide a method and apparatus as in the preceding object which may be cut from either the left or right side of a duct board.

Another object is to provide a method and apparatus for cutting shiplap groove duct board by hand in which measurements are made from a base leg indicia indicating the size of the duct wall and a single design of hand tool may be used for right and left hand shiplap cuts.

Other objects features and advantages of this invention will be apparent from the drawings, the specification and the claims.

In the drawings, wherein an illustrative embodiment is shown and wherein like reference numerals indicate like parts:

Figure 1:
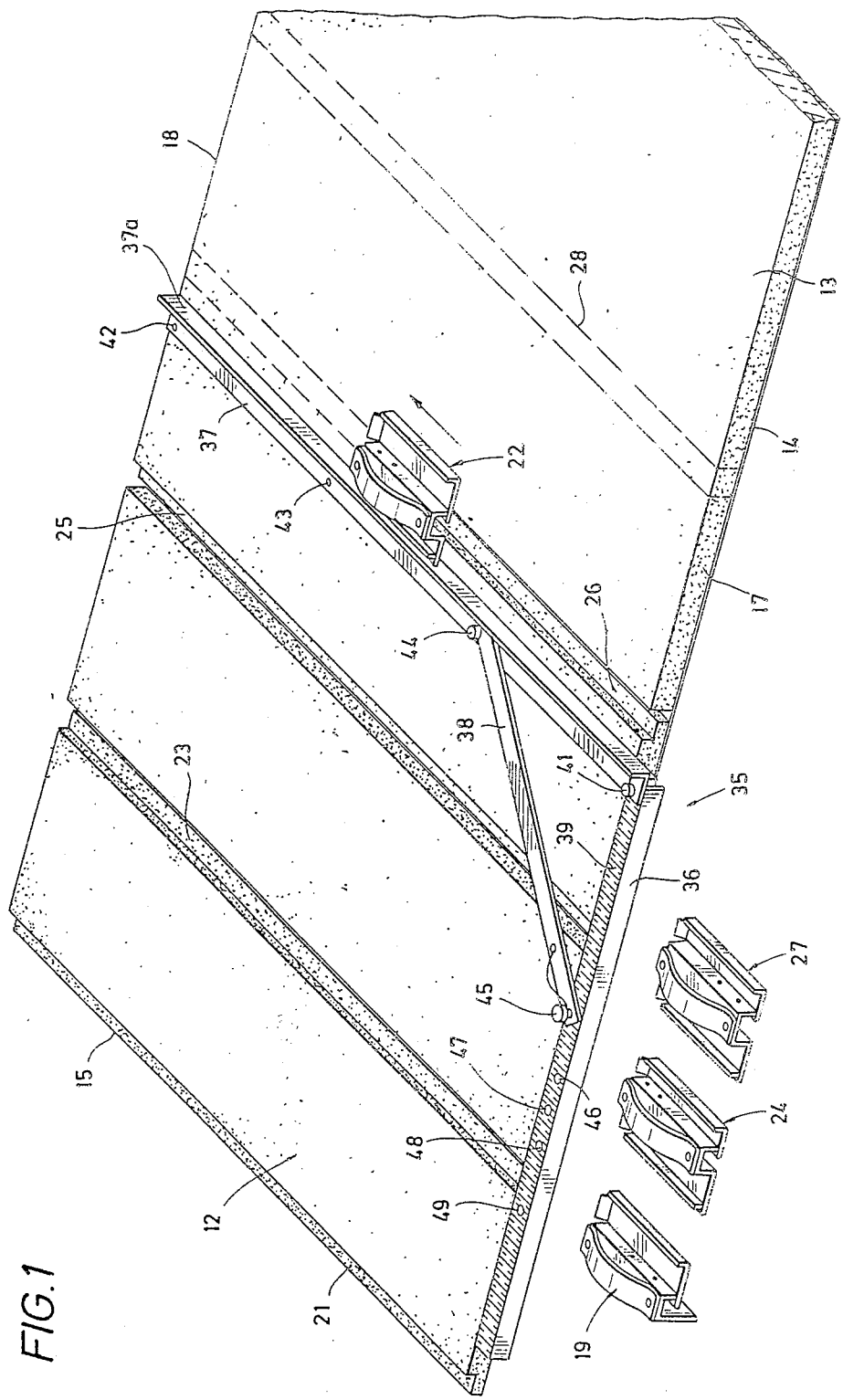
FIG. 1 is a schematic view of a duct board with an angle square thereon and cutting tools formed in accordance with this invention.

A conventional duct board is indicated generally at 12. The board 12 is usually manufactured of resin impregnated fiberglass 13 with a vapor impervious barrier 14 on one face. The board has a left side edge 15 and a right side edge 16 (FIG. 9) which are originally perpendicular to the vapor barrier. The bottom and top edges 17 and 18 have male and female shiplap grooves therein for mating with shiplap grooves in an adjacent duct. For simplicity of illustration these grooves are not shown.

Figure 2:
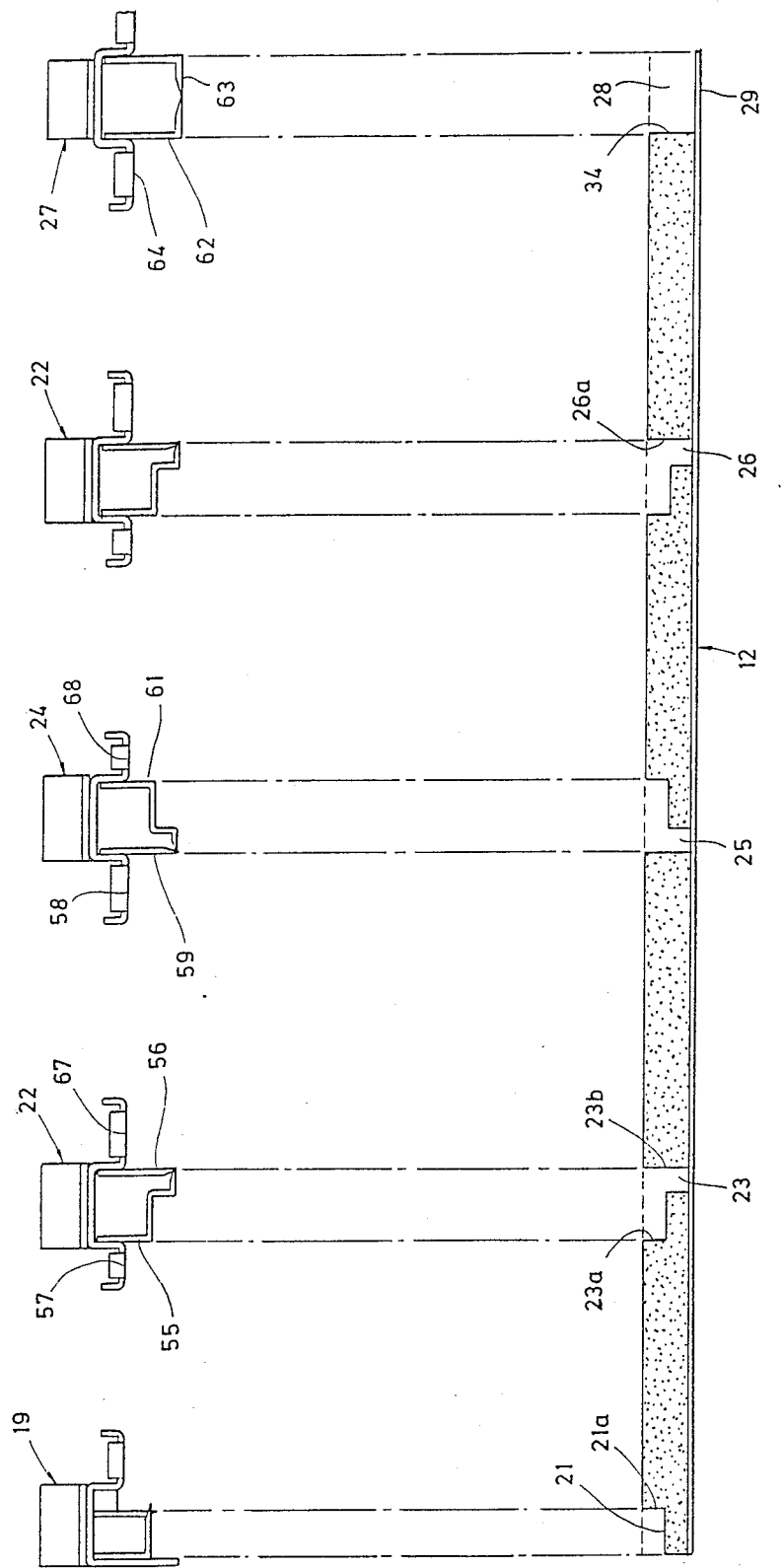
FIG. 2 is a bottom end view of a duct board with shiplap cuts therein with the cutting tools used to make each cut shown above the cut.

As illustrated in FIGS. 1 and 2 a number 1 tool indicated generally at 19 may be utilized to cut a notch or female groove 21 in the left side edge of the board. Then a number 2-4 tool indicated generally at 22 is utilized to cut a right hand shiplap groove 23 in the board. Then a number 3 tool indicated generally at 24 is utilized to cut a left hand shiplap groove 25 in the board. Then the number 2-4 tool 22 is again utilized to cut a second right hand shiplap groove 26 in the board. Then a number 5 tool indicated generally at 27 is utilized to cut a U-shaped groove 28 shown in dashed lines in FIG. 1 in the board. Finally the barrier is cut through with a knife at the right hand side of the U-shaped cut 28 to form a flap 29 (FIG. 2) and to remove the grooved section from the remainder of the board.

Figure 3:
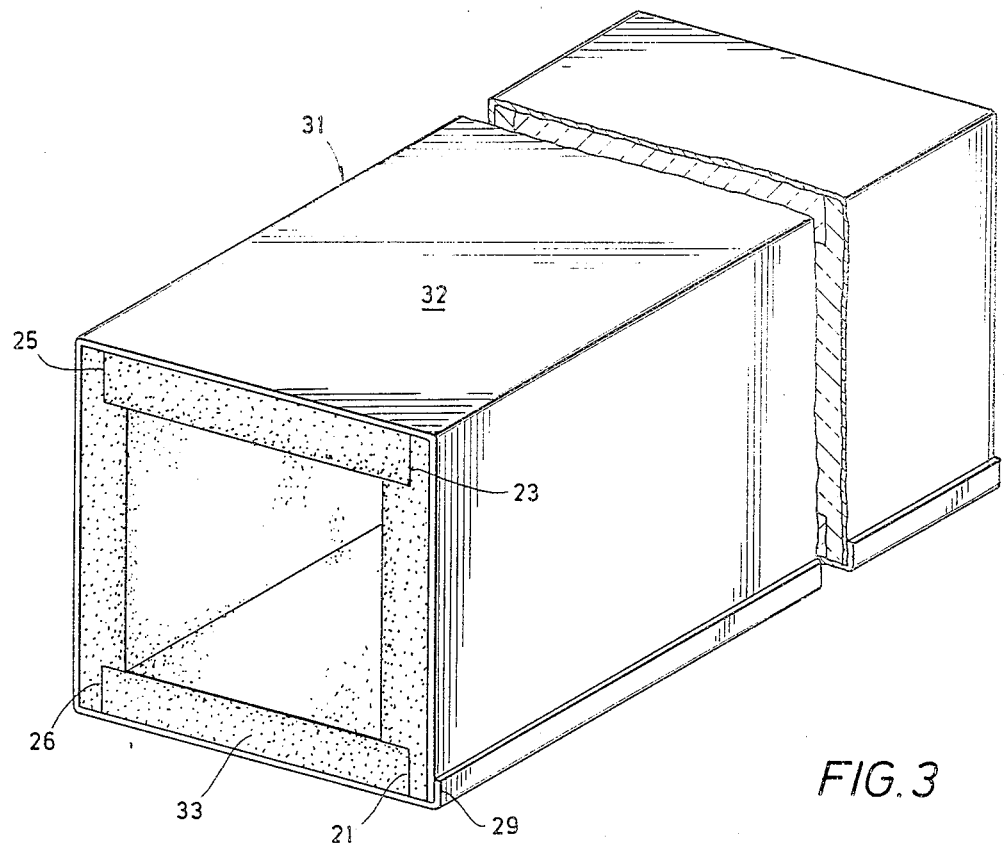
FIG. 3 is a view of the duct of FIG. 2 when formed into its rectangular configuration.

The grooved board section is then formed into a rectangular shaped duct indicated generally at 31 as shown in FIG. 3 and the flap is stapled and covered with a tape, not shown, in conventional manner (FIG. 3). Utilizing the cutting tools in the order described above and as shown in FIG. 2 results in opposite sides 32 and 33 of the duct formed such that the duct 31 may have side runs attached thereto in the conventional manner. Removing a section of either side 32 or 33 leaves two female shiplap notches for receiving the male shiplap which is standard on shiplap duct board. Thus runs may be extended from opposite sides 32 or 33 of the duct 31 or the duct turned ninety degrees in the conventional manner.

It is characteristic of conventional shiplap duct that a rectangular duct such as shown in FIGS. 2 and 3 has alternate left and right hand shiplap grooves 23, 25 and 26 as well as the females shiplap 21 for receiving the side edge 34 of the formed duct board. As shown in FIG. 2 this results in the distance between adjacent grooves differing by the thickness of the board being cut as the shiplap step depth is equal to one-half the thickness of the board. Thus with cutting of a one inch board to form a ten by ten inch duct as illustrated in the drawings, the distance between grooves 21 and 23 and between grooves 25 and 26 is ten inches, and the distance between grooves 23 and 25 and between grooves 26 and 29 is eleven inches.

In accordance with this invention the several cuts may be made by placing a selected indicia on a base leg of a square opposite the side edge of a previous cut and guiding a grooving tool along the guide leg of the square. For right hand cutting the indicia would be placed opposite the right hand side edge of each previous cut. This is accomplished by using cutters having different width sleds for engaging the guide leg of a square. The numerical indicia indicates the size of the duct. Thus to cut a ten by ten inch duct the operator places the indicia ten opposite the appropriate sides of previous cuts and makes the next cut.

The angle square indicated generally at 35 includes a base leg 36, a guide leg 37 and a bracing bar 38. The base leg is preferably formed of a downwardly facing channel member with the upwardly facing web having dimensional indicia 39 thereon. The guide leg 37 is secured to the base leg by pivot 41. The guide leg is preferably provided by an upwardly facing angle member to provide a guide surface 37a. The guide leg is provided with holes 42 and 43 for use in assembling the square for left hand use as will appear hereinafter. The bracing bar 38 is secured to the guide leg by fastener 44. The bar 38 is secured to the base leg by fastener 45 and in the illustrated assembly rigidly fixes the guide leg at ninety degrees to the base leg. Additional securing points 46, 47, 48 and 49 provide for the bar to be secured to the base leg with the guide leg at different angles to the base leg.

Figure 4:
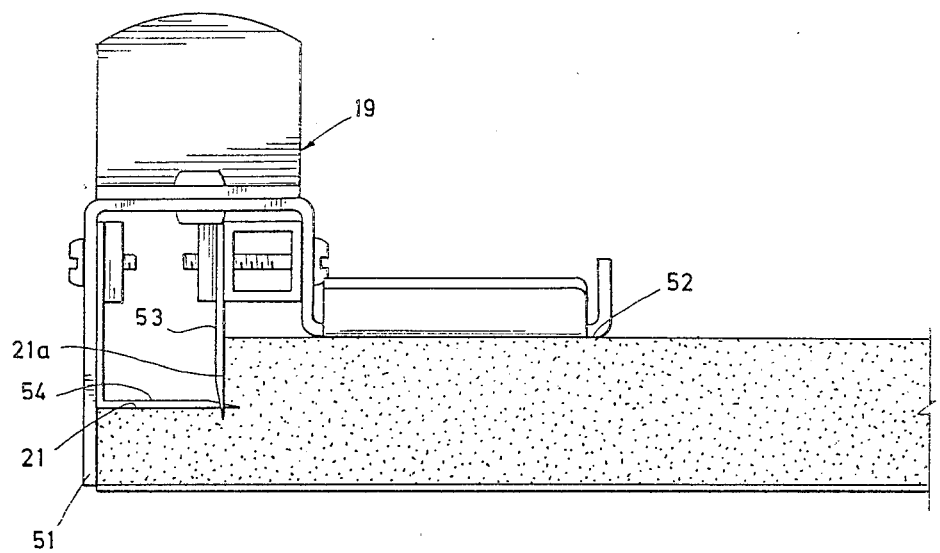
FIG. 4 is a fragmentary bottom end view of the duct board with the number 1 tool cutting a notch therein to form a female shiplap groove.
Figure 5:
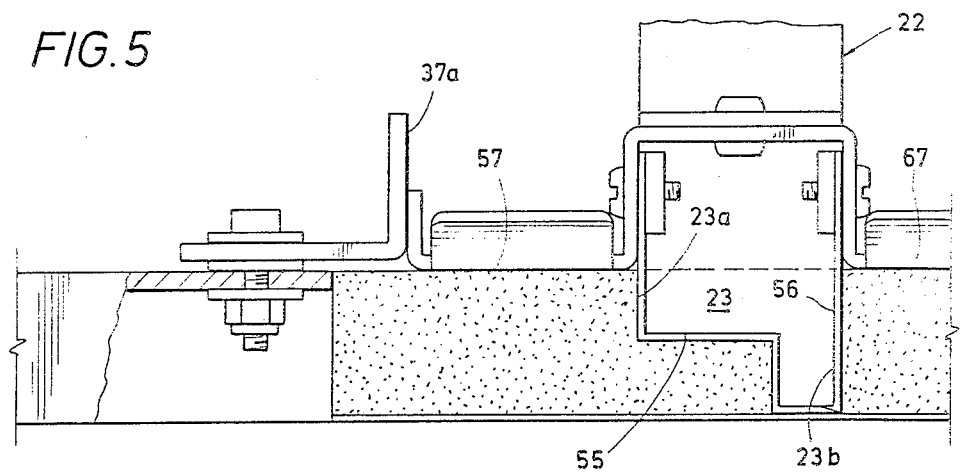
FIG. 5 is a fragmentary bottom end view of the duct board with the number 2-4 tool cutting a right hand shiplap groove.
Figure 6:
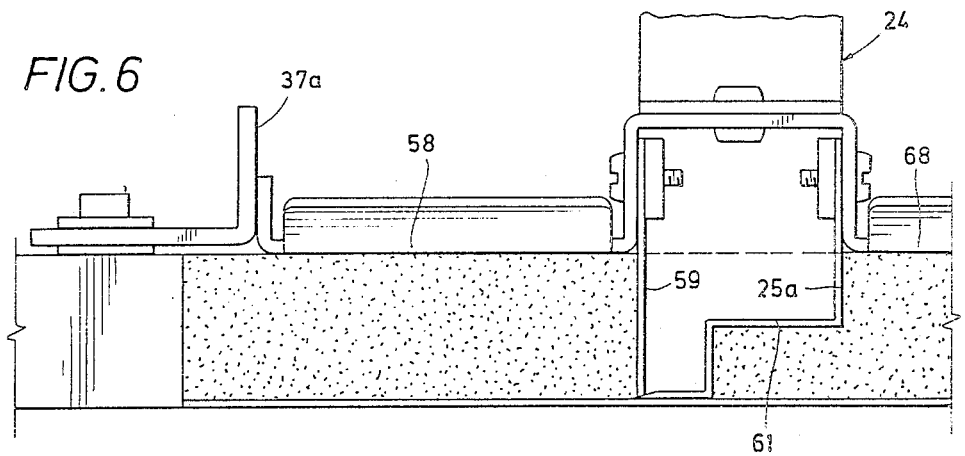
FIG. 6 is a fragmentary bottom end view of the duct board with the number 3 tool cutting a left hand shiplap groove.
Figure 7:
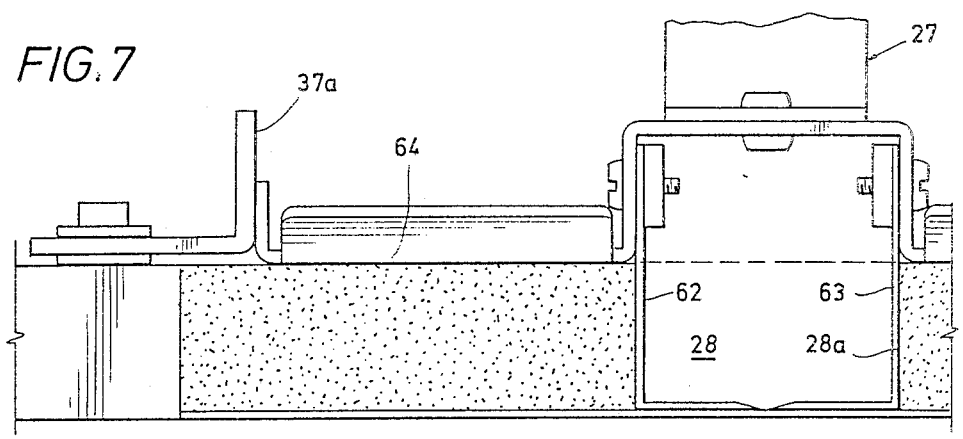
FIG. 7 is a fragmentary bottom end view of the duct board with the number 5 tool cutting a U-shaped groove for a flap.

The sheet of duct board is preferably placed on a table for convenience with the vapor barrier facing down. The square is not needed for the first cut in the right handed method which notches the left side edge of the sheet to provide a female shiplap 21. For this cut a standard number 1 tool (FIG. 4) is moved along the side edge of the board with its guide flange 51 against the side edge of the board and its sled 52 running on top of the board to permit the blades 53 and 54 to cut the notch 21.

Figure 10:
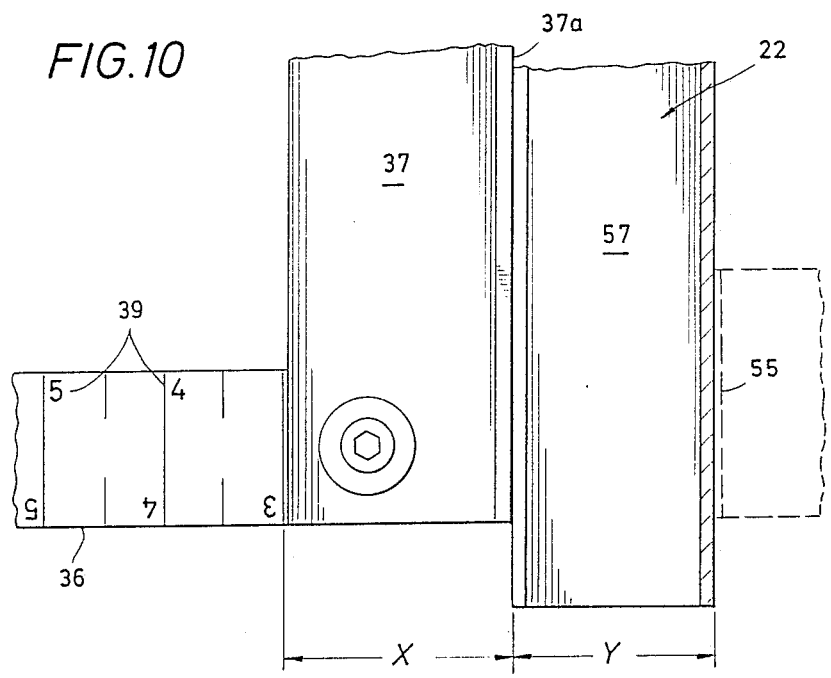
FIG. 10 is a fragmentary view of the base and guide legs of the square and the left sled of a number 2-4 tool in position to make a right hand shiplap cut and illustrating the relationship of the cutting blade and the indicia on the base leg of the square.
Figure 11:
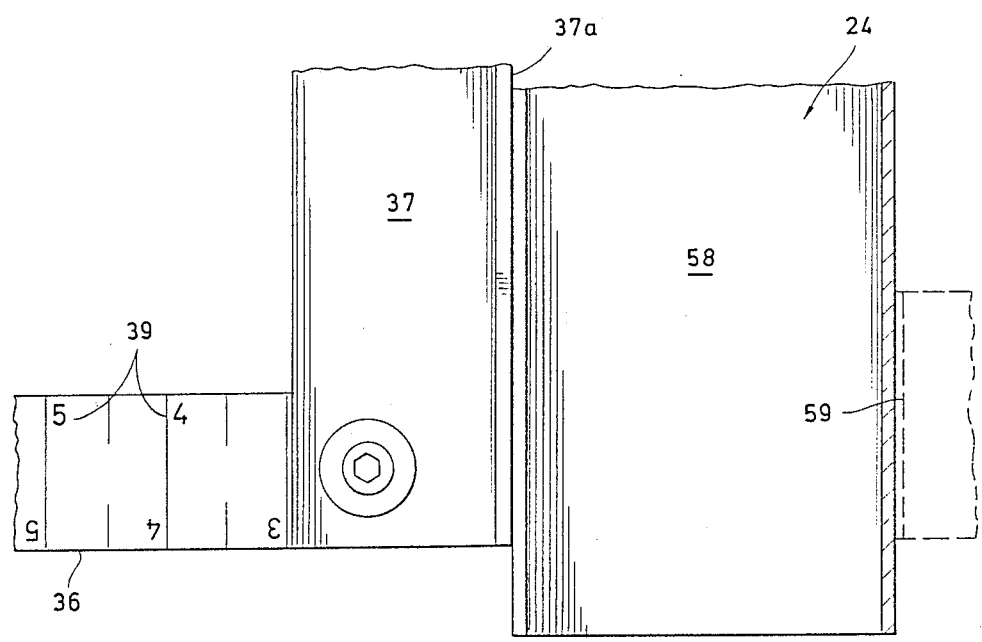
FIG. 11 is a view similar to FIG. 10 illustrating the square and a number 3 tool in position to make a left hand shiplap cut.

The angle square 35 is positioned with its base leg 36 held against the bottom edge 17 of the board and a selected indicia in register with the vertical wall 21a of notch 21. For instance for a ten inch duct the indicia ten is placed in register with wall 21a of notch 21. A specially designed number 2–4 cutting tool 22 makes the first right hand shiplap cut 23. While the tool 22 employs standard blades 55 and 56 to cut a standard right hand shiplap the tool has specially designed sleds that cooperate with the design of the square to correctly position the blades for making the cut. FIGS. 2 and 10 illustrate the design of the square base leg and tool sled. Referring to FIG. 2 which illustrates cutting of a ten by ten inch duct, the distance between the wall 21a of notch 21 and the adjacent blade 55 of the 2-4 tool 22 is ten inches. Referring to FIG. 10 the indicia 39 on the base leg 36 begins with the numeral 3 indicating 3 inches and progresses to the left along the base leg in increasing values at one inch intervals. In the preferred design the distance x between the lowest number of the indicia 39 and the guide surface 37a on the guide leg 37 is one and one-half inches. The distance y which is the width of the sled 57 of tool 22 is one and one-half inches. Thus the sum of x and y is equal to the value of the lowest value of the indicia 39 or three inches. The indicia marks off in increasing values the number of inches along the base leg beginning with three inches. By positioning the desired indicia ten opposite the surface 21a of notch 21 and positioning the tool 22 with its sled against the guide surface 37a the tool 22 in moving along the guide leg will cut a right hand shiplap with its surface 23a spaced ten inches from notch 21.

The distance between right hand shiplap 23 and the next groove 25 which is a left hand shiplap is ten inches plus the thickness of the board, in this case one inch, for a total of eleven inches. The left hand shiplap tool 24 has a left sled 58 having the width y plus the thickness of the board 12 of one inch, for a total of two and one-half inches. By placing the base leg with its indicia 10 opposite the right hand surface 23b of the cut made by blade 56, and the sled 58 of number 3 tool 24 against the guide surface 37a, the tool 24 may be moved along the guide leg to cut a left hand shiplap groove 25 spaced eleven inches from the right hand shiplap groove 23.

The next groove 26 is cut by again using the tool 22 in the manner hereinabove described to cut a second right hand shiplap groove spaced ten inches from the left hand shiplap groove 25.

The next step is to cut a flap eleven inches from the surface 26a which was cut by blade 56 of cutter 22 in cutting the second right hand shiplap groove 26. This involves cutting through the barrier 14 and removing the fiberglass. As the board is normally supported on a table it is preferred to cut through the barrier and then remove the fiberglass but it could be done with a single tool if desired. For this purpose a number 5 tool 27 is provided to make a U-shaped cut 28 with blades 62 and 63. The tool 27 is provided with a left side sled 64 having a width of y plus the thickness of the board or a total dimension of two and one-half inches. Thus positioning the indicia ten opposite the surface 26a of groove 26 and moving the sled 64 along the guide surface 37a results in a groove 28 spaced eleven inches from groove 26. Thereafter the flap may be cut from the remainder of the board by moving a knife along the surface 28a of groove 28 to cut through the barrier 14 and provide flap 29.

Preferably the system and method are convertible to permit cutting from the right side of the board to accommodate left handed workers.

Figure 8:
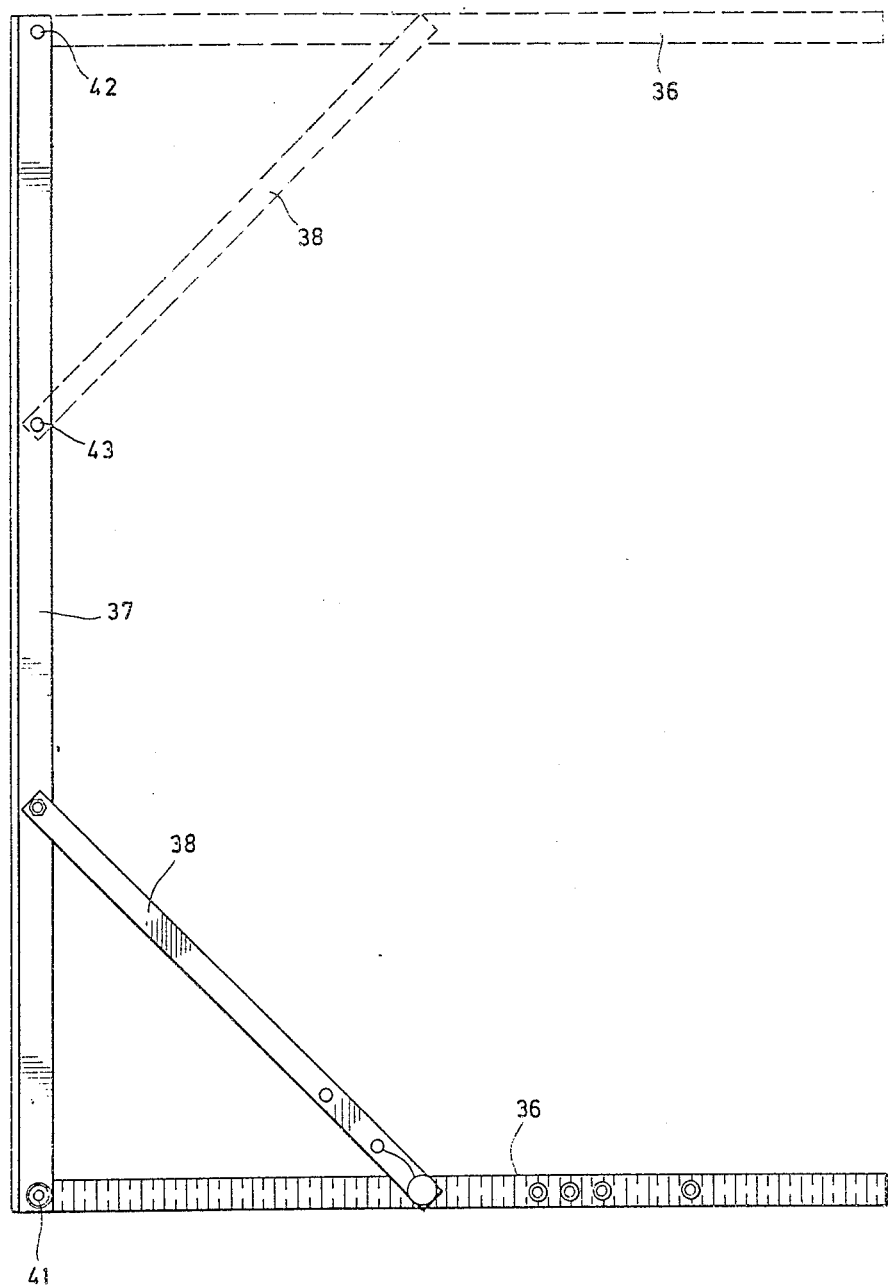
FIG. 8 is a top view of the angle square assembled for left hand cutting and illustrating in dashed lines the base leg secured to the other end of the guide leg for right hand cutting.

For left handed use the guide leg 37 is provided with attachment points 42 and 43. As shown in FIG. 8 the guide leg is attached to the base leg by fastener 41 utilizing attachment point 42. This positions the guide surface 37a on the left side of the guide leg. The base leg is rotated one hundred eighty degrees from the position shown in FIG. 1 so that the indicia increases to the right from the guide leg. Again the bar 38 extends between the two legs of the square to form a ninety degree square.

Utilizing the criteria hereinabove discussed for cutting one inch board the number 2–4 tool 22 is provided with a right hand sled having a width dimension of y plus one inch for a total width of two and one-half inches. The number 3 tool 24 is provided with a right hand sled 68 having a width of y or one and one-half inches.

The number 3 tool 24 is a mirror image of the number 2–4 tool 22 and by reversing the direction of movement of the tools and providing them with the proper blades the same tool body may be used for these two tools.

The number 5 tool 27 is provided with a right hand sled of y plus one and one-half inches or a total of two and one-half inches. The tool 27 may have its blades reversed and the tool reversed to cut in the opposite direction from that shown in FIG. 1. This provides the right hand sled of two and one-half inches. In the alternative the tool may have left and right hand sleds two and one-half inches in width and the same tool used to make the flap cut.

Figure 9:
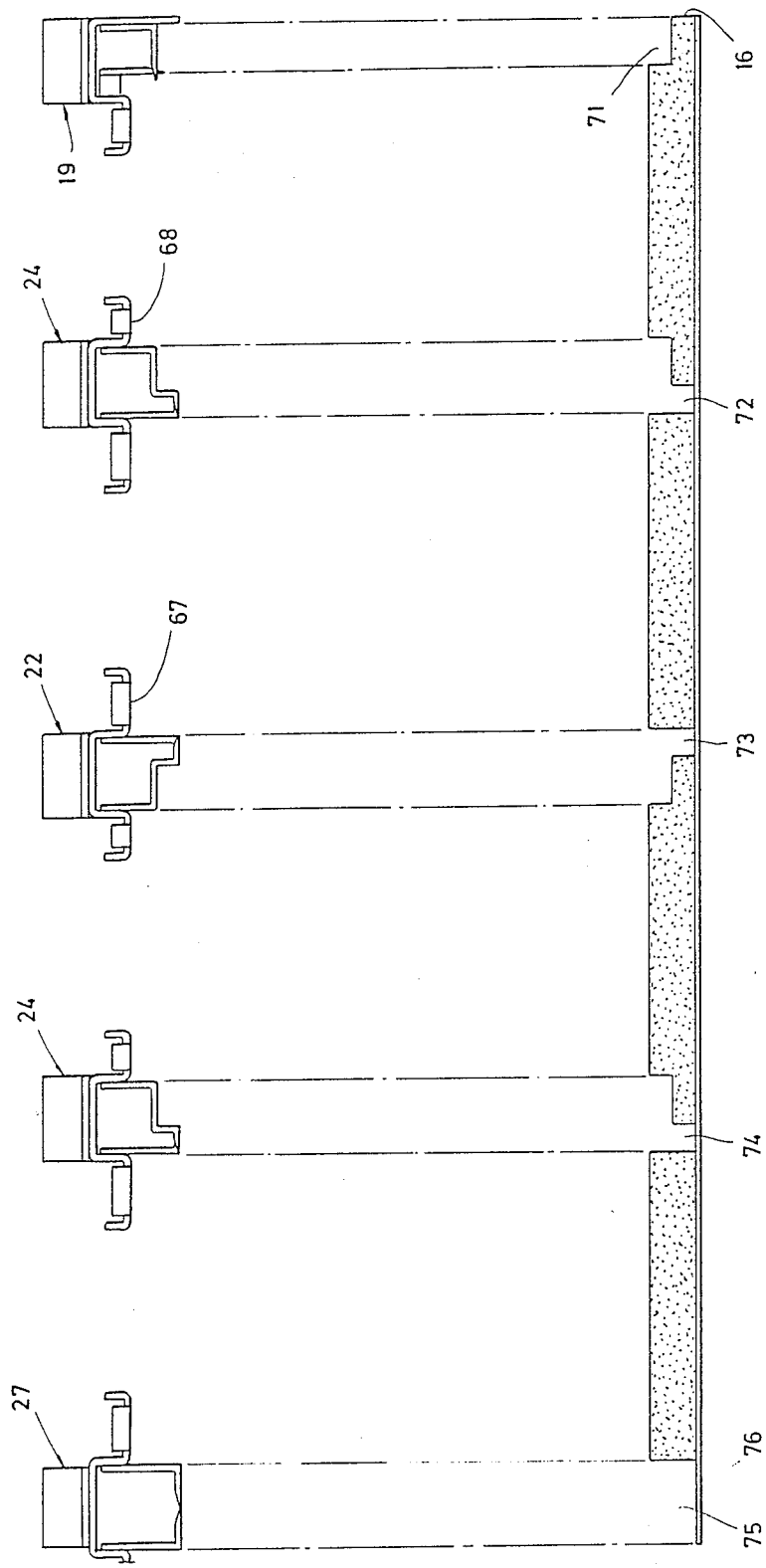
FIG. 9 is a bottom end view of a duct board with shiplap cuts therein beginning from the right hand side with the tool used to make each cut shown above each cut, similar to FIG. 2.

FIG. 9 illustrates cutting from the right hand side of the board. The number 1 tool cuts in both directions and by reversing the direction of the cut the guide 51 moves along the right side edge 16 of the board to cut female shiplap notch 71. Positioning the square as assembled in FIG. 8 with the indicia ten opposite the left wall of notch 71 and using the number 3 tool 24 with its sled 68 against guide surface 37a a left hand shiplap 72 is cut. Positioning the square with the indicia ten opposite the left wall of shiplap groove 72 and using the number 2-4 tool with its sled 67 against the guide surface 37a the right hand shiplap groove 73 is cut. Positioning the square with the indicia ten opposite the left wall of groove 73 and using the number 3 tool 24 again a second left hand shiplap groove 74 is cut. Positioning the square with the indicia ten opposite the left wall of groove 74 and using the number 5 tool a U-shaped groove 75 is cut. A knife is then used to cut the flap free from the remainder of the board to provide flap 76.

From the above it will be seen that shiplap groove ducts can be fabricated using the same indicia to fabricate opposite walls of a duct. Different indicia may be used for side walls and top walls to fabricate non-square duct. A single tool die may be used to provide the number 2-4 and the number 3 tools by reversing the direction of movement of the tool and changing the blades. By reversing the assembly of the square and changing the order of use of the 2-4 tool and the 3 tool the system accommodates both left and right handed workers.

The foregoing description of the apparatus and the method of using the apparatus are explanatory and illustrative only and are not to be taken in a limiting sense as various changes in sizes, shapes, arrangement of parts, variations in the method steps or in their performance, as well as variations in details in construction may be made within the scope of the appended claims without departing from the true spirit and teaching of the invention.

What is claimed is:

1. A tool set for forming shiplap grooves in a sheet of duct board material, comprising a plurality of slidable cutting tools, and an angle square for guiding a selected one of said tools individually across said sheet material, said angle square having a base leg with numerical indicia thereon for abutting a bottom edge of said duct board sheet, and a guide leg extending from one end of the base leg for overlying said duct board sheet and having a guide surface extending lengthwise of the guide leg for guiding a selected one of said cutting tools, said indicia beginning at a point spaced from the guide surface by a value x and continuing at equal spaced intervals along the base leg, and said plurality of tools including:

a number 1 cutting tool having a guide surface for slidably engaging a left side edge of said duct board sheet and cutting a female ship lap notch having a depth of approximately 50 percent of the duct board thickness in said side edge of the duct board sheet, a number 2-4 cutting tool for cutting a right hand shiplap groove in said duct board sheet, said number 2-4 cutting tool having a cutting blade and a left side spacing sled adjacent thereto, slidable over said sheet material, while in lateral contact with said guide surface, with a width dimension of a value y, a number 3 cutting tool for cutting a left hand shiplap groove in said duct board sheet, said number 3 cutting tool having a left side spacing sled with a width dimension of a value y plus the thickness of said duct board, and a number 5 cutting tool for cutting a U-shaped groove in said duct board sheet, said number 5 tool having a left side spacing sled with a width dimension of a value y plus the thickness of the duct board, the sum of x and y equal to said beginning indicia value.

2. The apparatus of claim 1 wherein:

said indicia begins with the numeral 3 spaced approximately one and one-half inches from said guide surface and indicates each additional inch along said base, said number 2-4 tool left side sled is approximately one and one-half inches wide, said number 3 tool left side sled is approximately two and one-half inches wide, and said number 5 tool left side sled is approximately two and one-half inches wide.

3. The apparatus of claim 1 wherein:

said number 2-4 tool has a right side spacing sled having a width dimension of a value y plus the thickness of the board, and said number 3 tool has a right side spacing sled having a width dimension of a value y.

4. The apparatus of claim 3 wherein:

said number 2-4 tool and said number 3 tool utilize identical bodies and the cutting blades are mounted for cutting in opposite directions.

5. The apparatus of claim 3 wherein:

said number 2-4 right side spacing sled has a width of two and one-half inches, and said number 3 right side spacing sled has a width of one and one-half inches.

6. The apparatus of claim 3 wherein:

said angle square has one end of the guide leg attached to the right hand end of the base leg and the base leg extends to the left of the guide leg for right hand grooving and, the opposite end of the guide leg is attached to the base leg at the same attachment point on the base leg and the base leg extends to the right of the guide leg for left hand grooving.

7. A tool set for forming shiplap grooves in a sheet of duct board material, comprising a plurality of slidable cutting tools, and an angle square for guiding a selected one of said tools individually across said sheet material, said angle square having a base leg with numerical indicia thereon for abutting a bottom edge of said duct board sheet, and a guide leg extending from one end of the base leg for overlying said duct board sheet and having a guide surface extending lengthwise of the guide leg for guiding a selected one of said cutting tools, said indicia beginning at a point spaced from the guide surface by a value of x and continuing at equal intervals along the base leg, and said plurality of tools including:

a number 1 cutting tool having a guide surface for slidably engaging a right side edge of said duct board sheet and cutting a female shiplap notch having a depth of approximately 50 percent of the duct board thickness in said side edge of the duct board sheet, a number 2-4 cutting tool for cutting a right hand shiplap groove in said duct board sheet, said number 2-4 cutting tool having a cutting blade and a right side spacing sled adjacent thereto, slidable over said sheet material, while in lateral contact with said guide surface, with a width dimension of a value y plus one inch, a number 3 cutting tool for cutting a left hand shiplap groove in said duct board sheet, said number 3 cutting tool having a right side spacing sled with a width dimension of a value y.

and a number 5 cutting tool for cutting a U-shaped groove in said duct board sheet, said number 5 tool having a right side spacing sled with a width dimension of a value y plus one inch, the sum of x and y equal to said beginning indicia value.

8. The apparatus of claim 7 wherein:

said number 2-4 tool right side sled is approximately two and one-half inches wide, said number 3 tool right side sled is approximately one and one-half inches wide, and said number 5 tool right side sled is approximately two and one-half inches wide.

9. The method of grooving a duct board having opposed left and right side edges and opposed top and bottom edges comprising:

sliding a number 1 cutting tool along the left side edge of duct board and cutting a female shiplap notch, selecting an angle square have a guide leg with a guide surface extending along the length thereof and a base leg having numerical indicia beginning at a point spaced from the guide surface by a value x and positioning the square with the base extending along the bottom edge of the duct board with a first selected indicia at the right hand surface of said female shiplap notch and said guide leg overlying said duct board, selecting a number 2-4 cutting tool having a left side sled with a width of a value y and moving the number 2-4 tool along the guide surface to cut a right hand shiplap groove, positioning the base leg with a second selected indicia at the right hand surface of said right hand shiplap groove, selecting a number 3 cutting tool having a left side sled with a width of a value y plus the thickness of said board and moving the number 3 tool along the guide surface to cut a left hand shiplap groove, positioning the base leg with said first selected indicia at the right hand surface of said left hand shiplap groove, moving said number 2-4 tool along the guide surface to cut a second right hand shiplap groove, positioning the base leg with said second selected indicia at the right hand surface of said second right hand shiplap groove, selecting a number 5 cutting tool having a left side sled with a width of a value y plus the thickness of said board and moving the number 5 tool along the guide surface to cut a U-shaped groove, and cutting through the barrier material of the duct board at the right side of the U-shaped groove, said values x and y equaling the beginning indicia value.

10. The method of grooving a duct board having opposed left and right side edges and opposed top and bottom edges comprising:

sliding a number 1 cutting tool along the right side edge of a duct board and cutting a female ship lap notch, selecting an angle square having a guide leg with a guide surface extending along the length thereof and a base leg having numerical indicia beginning at a value x from the guide surface and positioning the square with the base extending along the bottom edge of the duct board with a first selected indicia at the left hand surface of said female shiplap notch and said guide leg overlying the duct board, selecting a number 3 cutting tool having right side sled with a width of a value y and moving the number 3 tool along the guide surface to cut a left hand shiplap groove, positioning the base leg with a second selected indicia at the left side of said left hand shiplap groove, selecting a number 2-4 cutting tool having a right side sled with a width of a value y plus the thickness of said board and moving the number 2-4 tool along the guide surface to cut a right hand shiplap groove, positioning the base leg with said first selected indicia at the left side of said right hand shiplap groove, moving said number 3 tool along the guide surface to cut a second left hand shiplap groove, positioning the base leg with said second selected indicia at the left side of said second left hand shiplap groove, selecting a number 5 cutting tool having a right side sled with a width of a value y plus the thickness of said board and moving the number five tool along the guide surface to cut a U-shaped groove, and cutting through the barrier material of the duct board at the left side of the U-shaped groove, the sum of said values x and y equal to the value of said beginning numerical indicia.

11. The method of grooving a duct board having opposed left and right side edges and opposed top and bottom edges comprising:

sliding a number 1 cutting tool along one side edge of a duct board and cutting a female shiplap notch, selecting an angle square having a guide leg with a guide surface extending along the length thereof and a base leg having numerical indicia beginning at a value x from the guide surface and positioning the square with the base extending along the bottom edge of the duct board with a first selected indicia at the vertical surface of said female shiplap notch and said guide leg overlying said duct board, selecting a second cutting tool for cutting a shiplap groove with the step side of the groove adjacent said female notch and a sled on the step side of the groove with a width of a value y and moving said second tool along the guide surface to cut a first shiplap groove, positioning the base leg with a second selected indicia at the non-step side of said first shiplap groove, selecting a third cutting tool for cutting shiplap groove of opposite hand to said first shiplap groove and having a sled on the non-step side of the groove with a width of a value y plus the thickness of said board and moving said third tool along the guide surface to cut a second shiplap groove, positioning the base leg with said first indicia at the step side of said second shiplap groove, moving said second cutting tool along the guide surface to cut a third ship lap groove, positioning the base leg with said second selected indicia at the non-step side of the third shiplap groove, selecting a number 5 cutting tool with a sled on the side adjacent said third shiplap groove having a width of a value y plus the thickness of said board and moving said number 5 tool along said guide surface to cut a U-shaped groove, and cutting through the barrier material of the duct board on the side the U-shaped groove opposite said third shiplap groove, the sum of x and y equal to the value of said beginning indicia.

* * * * *